United States Patent
Birgisson et al.

(10) Patent No.: US 10,146,932 B2
(45) Date of Patent: Dec. 4, 2018

(54) DEVICE ACCESS REVOCATION

(71) Applicant: Google LLC, Mountain View, CA (US)

(72) Inventors: Arnar Birgisson, San Francisco, CA (US); Yevgeniy Gutnik, Cupertino, CA (US)

(73) Assignee: Google LLC, Mountain View, CA (US)

(*) Notice: Subject to any disclaimer, the term of this patent is extended or adjusted under 35 U.S.C. 154(b) by 0 days.

(21) Appl. No.: 15/387,776

(22) Filed: Dec. 22, 2016

(65) Prior Publication Data

US 2017/0220793 A1    Aug. 3, 2017

Related U.S. Application Data

(60) Provisional application No. 62/288,931, filed on Jan. 29, 2016.

(51) Int. Cl.
| | |
|---|---|
| G06F 21/45 | (2013.01) |
| G06F 21/62 | (2013.01) |
| H04L 29/06 | (2006.01) |
| H04W 12/08 | (2009.01) |

(52) U.S. Cl.
CPC ............ *G06F 21/45* (2013.01); *G06F 21/62* (2013.01); *H04L 63/083* (2013.01); *H04L 63/0807* (2013.01); *H04L 63/101* (2013.01); *H04L 63/102* (2013.01); *H04W 12/08* (2013.01)

(58) Field of Classification Search
CPC .......... G06F 21/35; G06F 21/44; G06F 21/45; G06F 21/62; H04L 63/0884; H04L 63/0807; H04L 63/101; H04L 63/102; H04L 63/083; H04W 12/06; H04W 12/08

USPC .......................................................... 726/6
See application file for complete search history.

(56) References Cited

U.S. PATENT DOCUMENTS

| | | |
|---|---|---|
| 6,279,111 B1 | 8/2001 | Jensenworth et al. |
| 6,397,009 B1 | 4/2002 | Davis et al. |
| 6,678,828 B1 | 1/2004 | Pham et al. |
| 7,844,001 B2 | 11/2010 | Routhier et al. |
| 8,042,163 B1 | 10/2011 | Karr et al. |
| 8,418,222 B2 | 4/2013 | Gbadegesin et al. |

(Continued)

OTHER PUBLICATIONS

Tanenbaum et al. "The amoeba Distributed Operating System—A Status Report," Dept. of Macthematics and Computer Science, Vrije Universiteit Amsterdam, The Netherlands, pp. 1-22.

(Continued)

*Primary Examiner* — Kambiz Zand
*Assistant Examiner* — Benjamin A Kaplan
(74) *Attorney, Agent, or Firm* — Fish & Richardson P.C.

(57) ABSTRACT

In some implementations, after one or more users have each been granted a respective access token allowing access to a resource device, revocation data is received by the resource device. The revocation data indicates that the previously granted access to the resource device should be revoked. For example, the revocation data may indicate (i) a user, role, or permission level for which access is revoked and (ii) a duration that access to the resource device was allowed. After receiving the revocation data, the resource device receives token data derived from an access token that allows access to the resource device. The resource device determines that the access token relies on authorization of the user, role, or permission level indicated by the revocation data, and in response, the resource device denies access.

15 Claims, 4 Drawing Sheets

(56) References Cited

U.S. PATENT DOCUMENTS

| | | | |
|---|---|---|---|
| 8,533,796 | B1 | 9/2013 | Shenoy et al. |
| 8,752,203 | B2 | 6/2014 | Reinertsen |
| 8,793,509 | B1 | 7/2014 | Nelson et al. |
| 8,856,887 | B2 | 10/2014 | Field-Eliot et al. |
| 8,898,766 | B2 | 11/2014 | Garmark et al. |
| 9,225,516 | B1 | 12/2015 | O'Connor et al. |
| 9,397,990 | B1 | 7/2016 | Taly et al. |
| 2002/0069174 | A1 | 6/2002 | Fox et al. |
| 2003/0028585 | A1 | 2/2003 | Yeager et al. |
| 2003/0055894 | A1 | 3/2003 | Yeager et al. |
| 2003/0055898 | A1 | 3/2003 | Yeager |
| 2003/0070070 | A1 | 4/2003 | Yeager et al. |
| 2003/0097573 | A1 | 5/2003 | Wheeler |
| 2004/0068757 | A1 | 4/2004 | Heredia |
| 2004/0083359 | A1 | 4/2004 | Camus et al. |
| 2004/0088347 | A1 | 5/2004 | Yeager et al. |
| 2004/0088348 | A1 | 5/2004 | Yeager et al. |
| 2004/0088369 | A1 | 5/2004 | Yeager et al. |
| 2004/0088646 | A1 | 5/2004 | Yeager et al. |
| 2004/0133640 | A1 | 7/2004 | Yeager et al. |
| 2005/0021969 | A1 | 1/2005 | Williams et al. |
| 2005/0086300 | A1 | 4/2005 | Yeager et al. |
| 2006/0212706 | A1 | 9/2006 | Jiang et al. |
| 2007/0204078 | A1* | 8/2007 | Boccon-Gibod ....... G06F 21/10 710/54 |
| 2009/0064342 | A1 | 3/2009 | Chan et al. |
| 2009/0254978 | A1 | 10/2009 | Rouskov et al. |
| 2009/0271847 | A1 | 10/2009 | Karjala et al. |
| 2010/0115267 | A1 | 5/2010 | Liang et al. |
| 2010/0199089 | A1 | 8/2010 | Vysogorets et al. |
| 2010/0212004 | A1 | 8/2010 | Fu |
| 2010/0293385 | A1 | 11/2010 | Nanda et al. |
| 2011/0087880 | A1 | 4/2011 | Sorniotti et al. |
| 2011/0225643 | A1 | 9/2011 | Faynberg et al. |
| 2011/0265172 | A1 | 10/2011 | Sharma et al. |
| 2012/0102566 | A1 | 4/2012 | Vrancken et al. |
| 2012/0204221 | A1 | 8/2012 | Monjas Llorente et al. |
| 2012/0210448 | A1 | 8/2012 | Vrancken et al. |
| 2012/0233705 | A1 | 9/2012 | Boysen et al. |
| 2012/0317655 | A1 | 12/2012 | Zhang et al. |
| 2013/0007856 | A1 | 1/2013 | Chang et al. |
| 2013/0019299 | A1 | 1/2013 | Vepsalainen et al. |
| 2013/0036455 | A1 | 2/2013 | Bodi et al. |
| 2013/0086645 | A1 | 4/2013 | Srinivasan et al. |
| 2013/0145435 | A1 | 6/2013 | Fu |
| 2013/0191884 | A1 | 7/2013 | Leicher et al. |
| 2014/0013110 | A1 | 1/2014 | Thoniel et al. |
| 2014/0019753 | A1 | 1/2014 | Lowly et al. |
| 2014/0020064 | A1 | 1/2014 | Hildebrand |
| 2014/0026193 | A1 | 1/2014 | Saxman et al. |
| 2014/0032759 | A1* | 1/2014 | Barton ................... H04L 67/10 709/225 |
| 2014/0040987 | A1 | 2/2014 | Haugsnes |
| 2014/0047513 | A1 | 2/2014 | Van't Noordende |
| 2014/0101722 | A1 | 4/2014 | Moore |
| 2014/0208119 | A1 | 7/2014 | Chang et al. |
| 2014/0230034 | A1 | 8/2014 | Le et al. |
| 2014/0245417 | A1 | 8/2014 | Hu et al. |
| 2014/0279553 | A1 | 9/2014 | Priebatsch et al. |
| 2014/0282881 | A1 | 9/2014 | Li et al. |
| 2014/0337955 | A1 | 11/2014 | Mendelovich et al. |
| 2015/0089569 | A1 | 3/2015 | Sondhi et al. |

OTHER PUBLICATIONS

Reed et al. "Authenticating Network Attached Storage," IEEE Micro 20.1, 2003, 9 pages.

Mittra et al. "A Flow-Based Approach to Datagram Security," ACM SIGCOMM Computer Communication Review 27.4, 1997, 14 pages.

Lopez-Alt. "Cryptographic Security of Macaroon Authorization Credentials," New York University, Tech. Rep., 2013, TR2013-962, 25 pages.

Gobioff. "Security for a High Performance Commodity Storage Subsystem," Diss. University of California at San Diego, Jul. 1999, 222 pages.

Birgisson et al. "Macaroons: Cookies with Contextual Caveats for Decentralized Authorization in the Cloud," 2014, 16 pages.

Birgisson et al. "Enforcing Authorization Policies using Transactional Memory Introspection," Proceedings of the 15$^{th}$ ACM Conference on Computer and Communications Security, 2008, 12 pages.

Aguilera et al. "Block level Security for Network-Attached Disks," 2003, 18 pages.

'wikipedia.org' [online]. "List of Bluetooth Protocols," Nov. 2016, [retrieved on Dec. 20, 2016] Retrieved on Internet: URL<https://en.wikipedia.org/w/index.php?title=List_of_Bluetooth_protocols&action=history> 6 pages.

'wikipedia.org' [online]. "Bluetooth," Dec. 2016 [retrieved on Dec. 20, 2016] Retrieved from the Internet: URL<https://en.wikipedia.org/w/index.php?title=Bluetooth&action=history> 26 pages.

'tools.ietf.org' [online]. "The OAuth 1.0 Protocol," Apr. 2010, [retrieved Dec. 20, 2016] Retrieved from Internet: URL<https://tools.ietf.org/html/rfc5849> 38 pages.

'theregister.co.uk' [online]. "Google's Nest weaves new Weave protocol that isn't Google's Weave," Oct. 2015, [retrieved Dec. 20, 2016] Retrieved from the Internet: URL<http://www.theregister.co.uk/2015/10/01/nest_app_protocol_open_to_devs/> 4 pages.

'rethinkresearch.biz' [online] "Google opens up Brillo and Weave," Nov. 2015, [retrieved on Dec. 20, 2016] Retrieved from the Internet: URL<http://rethinkrescarch.biz/articles/google-opens-brillo-and-weave/> 4 pages.

'Losant.com' [online]. "New Details on Googles Brillo and Weave," Jan. 2016, [retrieved on Dec. 20, 2016] Retrieved from the Internet: URL<https://www.losant.com/blog/everything-i-learned-about-googles-brillo-and-weave-at-ubiquity-dev-summit> 7 pages.

'leastprivilege.com' [online]. "Reference Tokens and Introspection," Nov. 2015. [retrieved Dec. 20, 2016] Retrieved from the internet: URL<https://leastprivilege.com/2015/11/25/reference-tokens-and-introspection/> 8 pages.

'hackingdistributed.com' [online]. Macaroons are Better Than Cookies, May 2016 [Retrieved on Dec. 20, 2016] Retrieved from the Internet: URL<http://backingdistributed.com/2014/05/16/macaroons-are-better-than-cookies/> 9 pages.

'Developers.googleblog.com' [online]. "Building Brillo-iant devices with Weave for a Connected world," Oct. 2015, [retrieved on Dec. 20, 2016] Retrieved from the Internet: URL<https://developers.googleblog.com/2015/10/building-brillo-iant-devices-with-weave_27.html> 4 pages.

'dcache.org' [online]. "Macaroons and dCache . . . or delegating in a cloudy world," Sep. 2015, [retrieved Dec. 20, 2016]. Retrieved from the Internet: URL<https://www.dcache.org/manuals/2015/presentations/20150930-PM-LSDMA-macaroons.pdf> 20 pages.

'Blog.bren2010.io' [online]. "Google's Macaroons in Five Minutes or Less," Dec. 2014, [retrieved on Dec. 20, 2016] Retrieved from the internet: URL<http://blog.bren2010.io/2014/12/04/macaroons.html> 4 pages.

'appleinsider.com' [online]. "Google's Nest team helps create Brillo & Weave, to simplify the connected Internet of Things," May 2015, [retrieved from the internet Dec. 20, 2016] Retrieved from the Internet: URL<http://appleinsider.com/articles/15/05/28/googles-nest-team-helps-create-brillo-weave-to-simplify-the-connected-internet-of-things> 3 pages.

International Search Report and Written Opinion in International Application No. PCT/US2017/014718, dated Apr. 10, 2017, 15 pages.

"Chapter 12: Key Establishment Protocols ED—Memezes A J; Van Oorschot P C; Vanstone S A," Handbook of Applied Cryptography; [CRC Press Series on Discrete Mathematices and its Applications], CRC Press, Boca Raton, FL, US, Oct. 1, 1996, 54 pages.

International Search Report and Written Opinion in International Application No. PCT/US2016/067286, dated Jul. 4, 2017, 20 pages.

International Preliminary Report on Patentability issued in International Application No. PCT/US2016/067286, dated Jan. 9, 2018, 7 pages.

(56) References Cited

OTHER PUBLICATIONS

Invitation to Pay Fees and, Where Applicable, Protest Fee, with Partial Search Report in International Application No. PCT/US2016/067286, dated May 11, 2017, 14 pages.

'tools.ietf.org' [online] "RFC 5280—Internet X.509 Public Key Infrastructure Certificate and Certificate Revocation List (CRL) Profile," May 1, 2008 [retrieved on Aug. 25, 2015] Retrieved from Internet: URL https://tools.ietf.org/html/rfc5280> 151 pages.

* cited by examiner

DEVICE ACCESS REVOCATION

CROSS-REFERENCE TO RELATED APPLICATIONS

This application claims priority from U.S. Provisional Patent Application No. 62/288,931 filed on Jan. 29, 2016 and titled "DEVICE ACCESS REVOCATION," which is hereby incorporated by reference in its entirety.

FIELD

This specification generally describes technology related to device access control systems.

BACKGROUND

Access control refers to security techniques that can be used to regulate users that can view or use a device. For instance, access control systems may limit access to properties, devices, computer networks, system files, and data.

SUMMARY

Device access revocation protocols can be used to prevent replay attacks in which valid data transmissions are used maliciously or fraudulently repeated. Some device access revocation protocols require complex client-server architectures with consistent network connectivity and high memory and storage requirements in order to protect users against security breaches. Such device access revocation protocols are often not appropriate for resource-constrained computing environments due to the limits on computing or storage resources that are available. Similarly, some systems may need to operate when there is limited or unreliable network connectivity.

In some implementations, an access control system includes an access control blacklist that is stored at a device. After authorization to access the device has been given, the access can be revoked by adding an entry to the blacklist. As an example, a resource device may delegate a portion of access control responsibility to another device, such as a server system which distributes access tokens that permit access to the resource device. The resource device may be configured to allow access when a valid access token is presented, without storing or checking a list of authorized users or devices. If the owner of the resource device decides to revoke access, however, valid access tokens may still exist and could be used to gain access. To block access even when a valid access token is presented, an entry can be added to the blacklist stored at the resource device. The resource device checks this blacklist when determining whether to provide access. Even if a valid access token is presented, the resource device can deny access if, for example, a user associated with the access token is identified in the blacklist. Other variations are discussed below, including the use of access blacklists that are stored remotely from the resource device and blacklisting groups of users, such as all users having a particular role or permission level.

The use of the blacklist allows revocation of access privileges more quickly than allowing an access token to expire. For instance, the access control blacklist can be updated so that, prior to the expiration of an access token, the blacklist restricts access to the resource device using the access token. In this regard, device access revocation of the resource device can be performed independently of device access authorization, providing added security during situations where immediate access restriction is preferable but not possible due to a prior access authorization.

In one general aspect, a method is performed by a resource device comprising a data processing apparatus, the method comprising: after one or more users have each been granted a respective access token allowing access to a resource device, receiving, by the resource device, revocation data indicating that the previously granted access to the resource device should be revoked, wherein the revocation data indicates (i) a user, role, or permission level for which access is revoked and (ii) a duration that access to the resource device was allowed; after receiving the revocation data, receiving, by the resource device, token data derived from an access token that allows access to the resource device; determining, by the resource device, that the access token relies on authorization of the user, role, or permission level indicated by the revocation data; and in response to determining that the access token relies on authorization of the user, role, or permission level indicated by the revocation data, denying, by the resource device, access to the resource device. Other versions include corresponding systems, and computer programs, configured to perform the actions of the methods encoded on computer storage devices.

Implementations may include one or more of the following features. For example, the method can include, in response to receiving the revocation data, storing an entry in an access control blacklist stored locally at the resource device, the entry indicating the user, role, or permission level indicated by the revocation data; and comparing one or more users, roles, or permission levels indicated in the stored blacklist with a user, role or permission level indicated by the token data derived from the access token. Denying the resource access to the resource device can be based at least in part on the comparison. The revocation data identifies (i) a particular user and (ii) the duration that an access token grants the particular user access to the resource. Determining that the access token relies on authorization of the user, role, or permission level indicated by the revocation data comprises determining that the token data was derived from a token issued to the particular user. Receiving the token data comprises receiving token data derived from an access token issued to a first user, the access token of the first user being based on the authority of a second user that is different from the first user.

In some implementations, the revocation data identifies (i) the second user and (ii) the duration that an access token issued to the second user grants the second user access to the resource device. Determining that the access token relies on authorization of the user, role, or permission level indicated by the revocation data includes determining that the access token of the first user is based on the authority of the particular user.

In some implementations, receiving the token data includes receiving token data derived from an access token issued to a first user, the access token of the first user being based on the authority of a second user that is different from the first user. The revocation data identifies (i) the second user and (ii) the duration that an access token issued to the second user grants the second user access to the resource device. In addition, determining that the access token relies on authorization of the user, role, or permission level indicated by the revocation data includes determining, based on the received token data, that the access token of the first user is based on the authority of the second user. Denying access to the resource device includes denying access to the resource device by the first user based on determining that the access token of the first user is based on the authority of the second user.

In some implementations, the resource device determines that the access token relies on authorization of the user, role, or permission level indicated by the revocation data based on locally stored data at the resource device, the resource device being configured to use the locally stored data to evaluate whether to grant access to the resource device independent of whether the resource device has network connectivity.

In some implementations, receiving the revocation data includes receiving the revocation data at a time that is (i) after a particular access token has been granted, the particular access token having an expiration time, and (ii) before the expiration time for the particular access token. Receiving the token data includes receiving token data derived from the particular access token. Determining and the denying are performed at a second time that is (i) after the particular access token has been granted and (ii) before the expiration time for the particular access token.

In some implementations, the method further includes: storing, in an access blacklist stored at the resource device, a blacklist entry for a user; determining, based on the blacklist entry, that one or more access tokens granted to the user have expired; and based on determining that one or more access tokens granted to the user have expired, deleting the blacklist entry for the user.

In some implementations, the method further includes: determining, by the resource device, that the received token data corresponds to a valid and unexpired token that provides access to the resource. Denying access to the resource device includes denying access to the resource device after determining that the received token data corresponds to a valid and unexpired token that provides access to the resource, based on determining that the access token relies on authorization of the user, role, or permission level indicated by the revocation data.

In some implementations, the revocation data is received, from a user device, through a proximity-based connection established between the resource device and the user device.

In some implementations, the revocation data is received, from a server computer, through a network connection established between the resource device and the server computer.

In another general aspect, a computer-implemented method includes: providing, by the one or more computers and to a user device associated with a user, an access token that enables the user device to gain access to a resource device, the access token being configured to expire at a predetermined expiration time; storing, by the one or more computers, an access control list indicating the user and the predetermined expiration time for the access token; receiving, by the one or more computers and before the predetermined expiration time, data indicating that access to the resource device by the user should be revoked; and transmitting, by the one or more computers and to the resource device, revocation data indicating the user whose access should be revoked and data indicating the expiration time.

In some implementations, transmitting the revocation data indicating the user whose access should be revoked and data indicating the expiration time includes transmitting revocation data for inclusion in an access control blacklist stored on the resource device.

In some implementations, the access control blacklist indicates a role or a permission level for accessing the resource device by the user.

In some implementations, the revocation data identifies (i) a particular user and (ii) the duration that an access token grants the particular user access to the resource.

Other implementations of these aspects include corresponding systems, apparatus, and computer programs, configured to perform the actions of the methods, encoded on computer storage devices. A system of one or more computers or other devices can be so configured by virtue of software, firmware, hardware, or a combination of them installed on the system that in operation cause the system to perform the actions. One or more computer programs can be so configured by virtue having instructions that, when executed by data processing apparatus, cause the apparatus to perform the actions.

The details of one or more implementations are set forth in the accompanying drawings and the description below. Other potential features and advantages will become apparent from the description, the drawings, and the claims.

BRIEF DESCRIPTION OF THE DRAWINGS

In the drawings, like reference numbers represent corresponding parts throughout.

DETAILED DESCRIPTION

In general, this specification describes an access control system that includes an access control blacklist that facilitates revoking authorization to access a resource device. For instance, the blacklist can be stored locally at the resource device. The blacklist can be updated so that a user's access to the resource device can be blocked even if the user possesses a valid access token for accessing the resource device.

As described throughout, a "resource device" can be any type of electronic device in which access to the device is controlled. For instance, examples of resource devices include mobile devices, desktop computers, connected home appliances, connected speakers, and physical locks. Generally, a resource device may be any type of electronic device, especially a device that delegates at least some access control functions to another entity.

Access to the resource device refers to either physical or logical access by a device of a user that is not the owner of the resource device. For instance, if the resource device is a door lock or an alarm system for a property, access may involve unlocking the lock or disabling the alarm. In other examples, access may involve access to data, such as allowing playback of personal media stored on a resource device.

Figure 1:
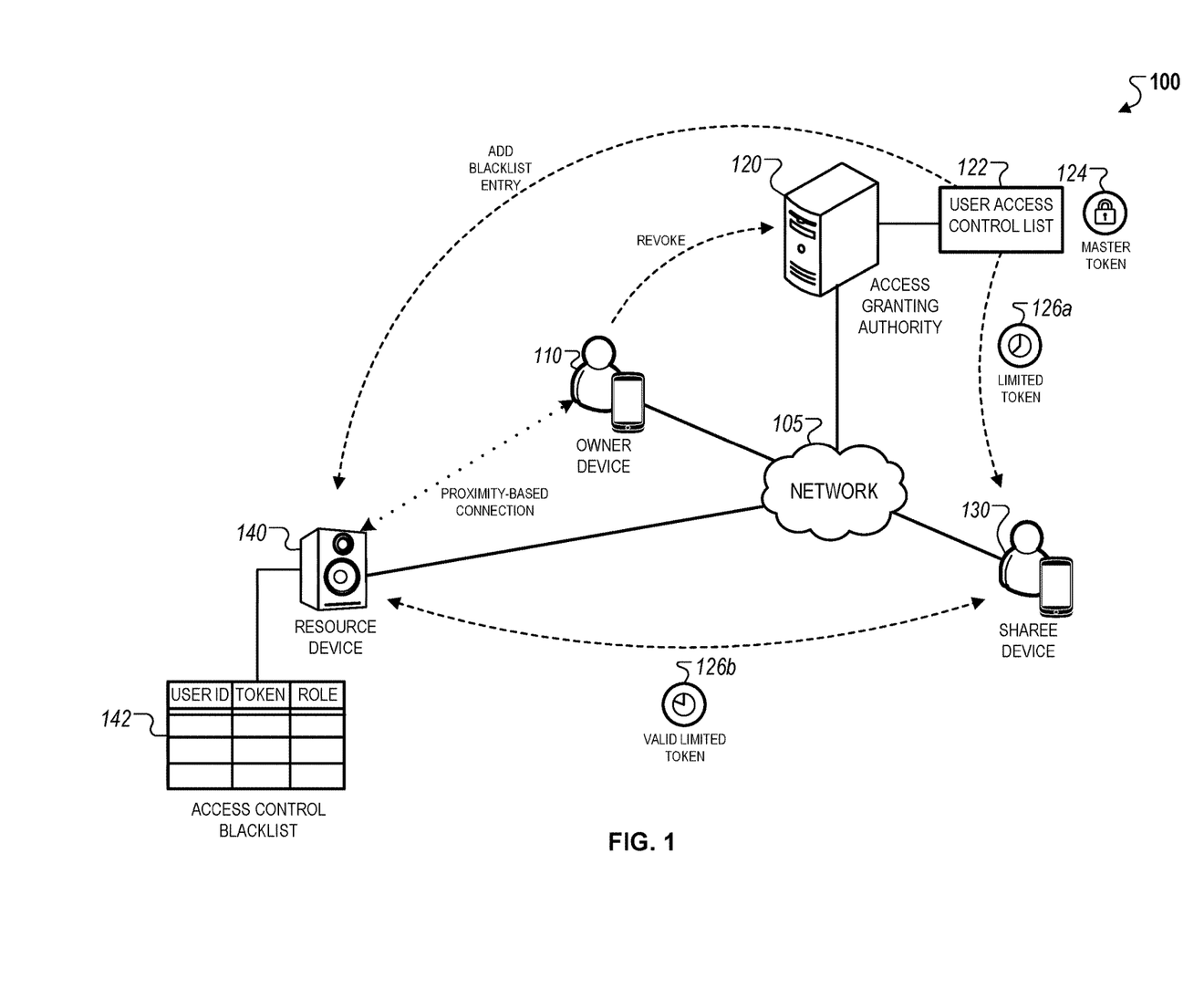
FIG. 1 is a diagram that illustrates an example of an access control system that includes an access control blacklist.

FIG. 1 is a diagram that illustrates an example of an access control system 100. The example shows techniques for controlling access to a resource device 140. The resource device 140 is owned by an owner, who uses the system 100 to authorize another user, a "sharee" to access the resource device 140. After granting access to the sharee, the owner uses the system 100 to revoke the access of the sharee using an access control blacklist 142.

The access control system 100 includes an owner device 110, an access granting authority 120, and a sharee device 130 connected over a network 105. The access granting authority 120 stores a user access control list 122 and an associated master token 124. The sharee device 130 is provided with a limited token 126a, which is then used to provide access to a resource device 140 by transmitting token data 126b. The resource device 140 also stores an access control blacklist 132.

In more detail, the owner device 110 can be an electronic computing device that is associated with an owner of the resource device 140. The owner device 110 can be a mobile device that an owner uses to grant and revoke authorization to access the resource device 140. For example, the owner device 110 can transmit access control data that specifies users that can access the resource device 140 and one or more conditions associated with the access (e.g., time period of access, permission levels for access, etc.) to the access granting authority 120. The access control data can then be used by the access granting authority 120 to generate and maintain the user access control list 122.

The access granting authority 120 can be a remote server or controller that provides limited access to the resource device 140 based on delegations made by the owner device 110. For instance, the access granting authority 120 can store the user access control list 122, which specifies a list of authorized users that have access the resource device 140 based on the access control data transmitted from the owner device 110. In addition, the access granting authority 120 can maintain a master token 124 that includes credential data used to generate limited access tokens for users specified within the user access control list 122. For example, the master token 124 can include credential data that provides unrestricted access to the resourced device 140.

The access granting authority 120 can use the information included within the user access control list 122 and the master token 124 to generate a limited token for each user identified in the access control list 122. The limited tokens provide the recipient the ability to access the resource device 140. For example, the access granting authority 120 can generate the limited token 126a for the sharee device 130, which is subsequently transmitted as token data 126b to provide access, by the sharee device 130, to the resource device 140.

The limited token 126a can include one or more unique token parameters that control when the limited token 126a is valid. For example, the limited token 126a can include an expiration time that specifies a time-to-live (TTL) period where the limited token 126a is valid and available for use by the sharee device 130 to access the resource device 140. In some instances, limited access tokens are expire 24 hours after they are issued, and access over longer period requires issuance of a new limited token from the access granting authority 120. Any appropriate period of validity can be used (for example, seconds, minutes, hours, days, weeks, and so on.) In this example, the limited token 126a becomes invalid after the expiration time such that the sharee device 130 is unable to use the token data 126b to access the resource device 140 after the expiration time. In other examples, the limited token 126 can include conditions associated with the sharee device 130 that lead to the limited token 126a becoming invalid. For instance, the limited token 126a can specify particular geographic locations of the sharee device 130 where the limited token 126a is invalid. In this example, the limited token 126a can be invalid during certain time periods where the device conditions of the sharee device 130 are limited by the limited token 126a, and valid during other time periods where the device conditions of the sharee device 130 are not limited by the limited token 126a. In some implementations, the limited token 126a can include one or more unique token parameters that are specifically associated with the sharee device 130.

The sharee device 130 can be an electronic computing device associated with a user that requests access to the resource device 140 from the owner device 110. For instance, the sharee device 130 can be a mobile device that receives shared limited access to the resource device 140 from the owner of the resource device 140. As described above, access to the resource device 140 can be authorized with the use of a limited token 126a that includes conditions for access and includes information that specifies when the limited token 126a can be used to authorize access to the resource device 140.

As described previously, access authorization to the resource device 140 can be specified by the user access control list 122 and the limited token 126a. In many instances, the resource device 140 has limited data storage and limited processing capability. Additionally, the resource device 140 may not have an available Internet connection or any other network connectivity with the access granting authority 120. To deal with these limitations, in some implementations, the resource device 140 does not store the access control list 122 of authorized users, and does not access the access control list 122 when determining whether to grant access. Rather, the resource device 140 evaluates token data received from a limited access token, and determines from the token data whether access is authorized.

After limited access tokens are issued, they are generally valid until expiration. To allow a device owner to revoke authorization without waiting until the expiration of outstanding tokens, revocation data may be transmitted to a resource device and stored in a blacklist. The resource device 140 can be associated with an access control blacklist 132 that indicates access revocations. The access control blacklist 132 refers to a list of entries that includes revocation data. In some implementations, the revocation of access has been initiated by the owner device 110. For instance, the revocation data can include user identifiers that represent values indicative of a user identity, such as a hash value or other types of derivatives of data associated with the user. The access control blacklist 132 also specifies information related to the limited token 126a for a user whose access has been revoked. For example, the information can include the type of token provided to the user, the unique token parameters that specify when the limited token 126a becomes invalid, or device conditions associated with the sharee device 130 that also impacts the validity of the limited token 126a.

The revocation data included within the access control blacklist 132 can be used to revoke access authorization to the sharee device 130. For instance, in some implementations, each blacklist entry within the access control blacklist 132 can specify token information for the sharee device 130. The resource device 140 then uses the token information included within the access control blacklist 132 to block access by the sharee device 130 based on comparing token information included within the access control blacklist 132 and the information included within the limited token 126a. In other implementations, each blacklist entry within the access control blacklist 132 can specify user information (e.g., user identifier data), which is then used to identify a user associated with the sharee device 130 and block access accordingly.

The revocation data can be received and processed by the resource device 140 using various techniques. In some implementations, the resource device 140 is connected to the access granting authority over the network 105, at least occasionally, and receives revocation data over the network 105. In such implementations, the owner device 110 transmits revocation data to the access granting authority 120, which then transmits an instruction to add a blacklist entry to the resource device 140. In response, the resource device 140 updates the access control blacklist 142 to add a new blacklist entry that includes the revocation data.

Alternatively, in other implementations, the revocation data can be directly transmitted to the resource device 140 from the owner device 110 without network connectivity to the access granting authority 120. For instance, the owner device 110 can be capable of establishing a proximity-based connection with the resource device 140. The proximity-based connection can be a direct wired or wireless communication standard for exchanging data over short distances. For example, the proximity-based connection can be a Bluetooth connection, an infrared (IR) connection, a near-field communication (NFC) connection, or a universal serial bus (USB) connection. In such implementations, the revocation data can be transmitted offline when the resource device 140 or the owner device 110 does not presently have network connectivity.

In some implementations, the content of the access control blacklist 142 can be used to perform device access checks for multiple users that are associated with the sharee device 130. Sometimes a user's authorization depends on the authorization of one or more users, resulting in a chain of authority between users. For example, the owner of a device may share access with Adam, who shares access with Bob, who shares access with Chris. If any of the users in the chain of authority are blacklisted, access is denied. For example, if Chris attempts access and Adam has been added to the blacklist, then the resource device can deny Chris access because his authorization depends on the authorization of a blacklisted user.

As another example, revocation of the authorization of one user can result in information about multiple users being included in the blacklist. For example, when a particular user's access is revoked, data indicating the particular user and all users whose authority to access the resource device 140 depend on the authority of the particular user. Thus, a chain of authority including all users receiving authorization directly or indirectly through the particular user can be identified in the blacklist and their access can be blocked. The blacklist may include a chain of authority as a single entry, or as multiple separate entries that each identify a different blacklisted user. For example, in response to receiving revocation data indicating a particular access token, the resource device 140 can determine, if the particular access token was used to grant authorization to other users. In response, the resource device 140 can then add additional blacklist entries for the other users that received authorization from that token. Thus, the revocation associated with the particular access token propagates to all associated users, who are then also unable to access the resource device 140 as a result.

In some implementations, the access control blacklist 142 can be used to revoke access authorizations based on user classification information included within the user access control list 122. For instance, the user access control list can include a user role, permission level, or other attributes associated with a particular group of users. In such implementations, in response to receiving revocation request from the owner device 110 indicating a user classification, the access granting authority 120 can identify all users within the user access control list 122 that share the user classification. The access granting authority 120 then transmits revocation data to the resource data 140 that identifies all of the users that share the user classification included within the revocation request. The resource device 140 can then create entries for all of the users within the access control blacklist 142 and subsequently deny access to one of these users that subsequently transmits an access request to the resource device 140. Alternatively, a single entry may be used to revoke access for all users having a particular classification. For example a blacklist entry may specify that access is revoked for all users classified as "adminstrators," without naming those users individually.

The access control blacklist 142 can be stored and accessed by the resource device 140 for revoking access by the sharee device 130. In some implementations, the access control blacklist 142 is locally stored on the resource device 140 and periodically updated by the resource device 140 in response to receiving revocation data. In such implementations, in response to receiving newly submitted revocation data, the resource device 140 can update the blacklist to include additional entries for the received revocation data and remove other blacklist entries from a prior time period that are no longer relevant to the user access control list 122. In this regard, the resource device 122 can perform maintenance on the locally stored access control blacklist 142 such by intelligently adding and removing blacklist entries based on the relevance to the user access control list 122.

In some implementations, instead of being stored locally on the resource device, the access control blacklist 142 can instead be stored on a separate location that is accessible by the resource device 140 at the time of access by the sharee device 130. For instance, in response to receiving an access token from the sharee device 130, the resource device 140 then accesses the separate location to determine if the user of the sharee device 130 has been added to the access control blacklist 142. The separate location can be a separate computing device connected over the network 105 (e.g., a remote server), the owner device 110, or another locally connected device that is capable of exchanging communications with the resource device without connectivity to the access granting authority 120 (e.g., an external storage device).

In some instances, the access control blacklist 142 is allocated fixed amount of memory in which to store information, for example, to facilitate use in resource-constrained computing environments. The blacklist 142 may have a fixed length or fixed size, for example, allowing for 100 entries, 1000 entries, or some other predetermined number of blacklist entries. As described above, the resource device 140 can add or remove individual blacklist entries based on receiving revocation data and information associated with the user access control list 122. For example, the resource device 140 can remove blacklist entries from the access control blacklist 142 that correspond to expired access tokens. These entries may be purged after a particular period after the expiration date, since the sharee device 130 can no longer access the resource device using these expired tokens, indicating that the revocation data within the access control blacklist 142 is unnecessary. This technique can be used by the resource device 140 to keep sufficient space available for blacklist entries that correspond to tokens that are still valid.

In some implementations, blacklist entries corresponding to expired tokens are not actively purged, but are replaced by newer entries. For example, a device can overwrite entries corresponding to expired tokens with new blacklist entries as additional revocation data is received.

In some implementations, the resource device 140 is capable of intelligently performing maintenance operations on the access control blacklist 142 based on a set of device attributes associated with the sharee device 130 and token data derived from the limited token 126a. For example, the resource device 140 can perform different types of maintenance operations on the access control blacklist 142 based on a device classification of the sharee device 130 (e.g., prioritizing individual blacklist entries based on particular device types, roles, or permission levels that indicate a greater security risk). In another example, the resource device 140 can predict a security risk associated with received revocation data based on the particular token data of the limited token 126a, and coordinate operations with the access control blacklist 142 accordingly to mitigate the security risk (e.g., prioritizing operations for access tokens that are predicted to lead to high levels of access compared to operations for access tokens that are predicted to lead to lower levels of access).

In the example depicted in FIG. 1, the access control blacklist 142 can be used to revoke access to the resource device 140. As a result, access to the resource device 140 by the sharee device 130 is blocked, prior to the expiration of the limited token 126a, based on receiving revocation data from the owner device 110. For instance, although the token data 126b is transmitted to the resource device 140 on January 15, prior to the expiration of the limited token 126a on January 25, the resource device 140 denies access to the sharee device 130 based on the access control blacklist 142 including a blacklist entry for a user with the User ID "10001." In this example, the resource device 140 identifies that a subsequent access request from the sharee device 130 is associated with a user included in the access control blacklist 142 based on comparing the User ID specified by the blacklist entry and the user ID indicated by the token data 126b.

Figure 2A:
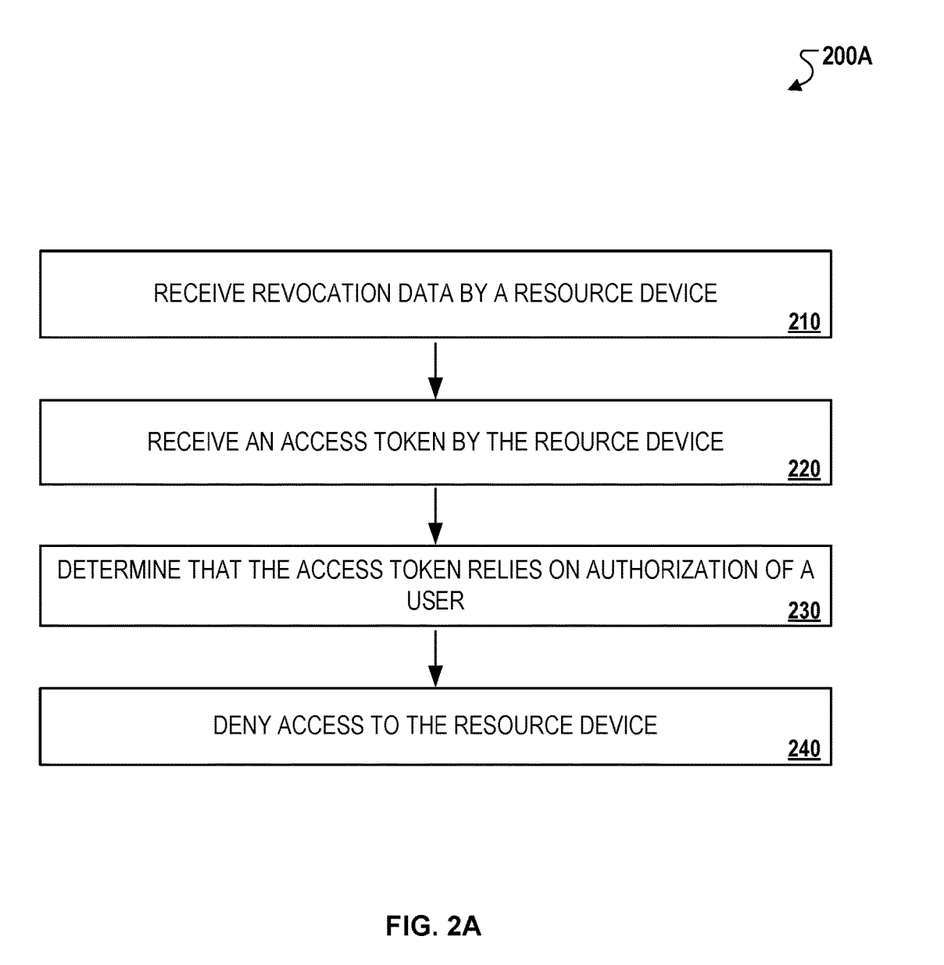
FIGS. 2A-2B are diagrams that illustrate examples processes for revoking access on a resource device.
Figure 2B:
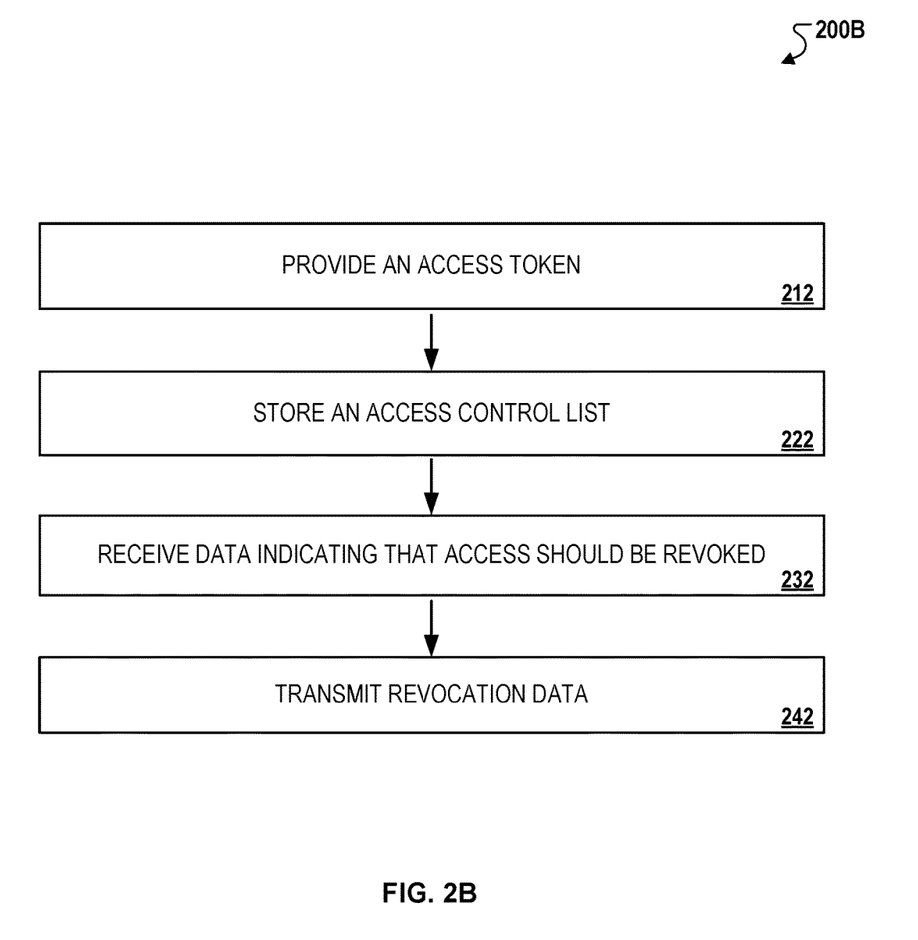

FIGS. 2A-2B are diagrams that illustrate examples processes 200A-200B for revoking access to a resource device. Referring to FIG. 2A, the process 200A can include receiving revocation data by a resource device (210), receiving an access token by the resource device (220), determining that the access token relies on authorization of a blacklisted user (230), and denying access to the resource device (240).

In more detail, the process 200A can include receiving revocation data by a resource device (210). For instance, after one or more users have each been granted a respective limited access token 126a allowing access to the resource device 140, the resource device 140 receives revocation data indicating that the previously granted access to the resource device 140 should be revoked. As described previously, revocation data can indicate a user, role, or permission level for which access in revoked and a duration that access to the resource device was allowed.

In some implementations, the revocation data can be transmitted from the access granting authority 120 to the resource device 140 over the network 105. For example, the owner device 110 initially transmits a revocation instruction to the access granting authority 120, which then accesses the user access control list 122 in order to identify a particular user or access token indicated by the received revocation instruction and then generates the revocation data to transmit to the resource data 140.

Alternatively, in other implementations, the revocation data can be transmitted directly from the owner device 110 over a proximity-based connection between the resource device 140 and the owner device 110. For example, the proximity-based connection can be a Bluetooth connection, a NFC connection, an IR connection, or a USB connection that enables the resource device 140 to receive revocation without network connectivity to the access granting server 120.

In some implementations, the revocation data identifies a particular user and the duration that an access token grants the particular user access to the resource device. In such implementations, determining that the access token relies on authorization of the user, role, or permission level indicated by the revocation data, as described in step 230 below, includes determining that the token data was derived from a token issued to the particular user.

In some implementations, receiving the revocation data includes receiving the revocation data at a time that is after a particular access token with an expiration time has been granted, and before the expiration time for the particular access token. In such implementations, receiving the token data by the resource device 140, as described in step 220 below, includes receiving token data derived from the particular access token. In addition, determining and the denying, as described in steps 230 and 240, respectively, are performed at a second time that is after the particular access token has been granted and before the expiration time for the particular access token.

The process 200A can include the resource device receiving data derived from an access token (220). For instance, after receiving the revocation data, the resource device 140 can receive the token data 126b derived from the limited token 126a that allows access to the sharee device 130. As described previously, the token data 126b can include a user identifier that corresponds to a user, such as a hash or a derivative of other user data that is used to indicate a particular user, and information associated with the limited token 126a such an expiration date of the token or a duration of validity of the token.

In some implementations, receiving the token data includes receiving token data derived from an access token issued to a first user. The access token of the first user can be based on the authority of a second user that is different from the first user. The revocation data identifies the second user and the duration that an access token issued to the second user grants the second user access to the resource device. In such implementations, determining that the access token relies on authorization of the user, role, or permission level indicated by the revocation data, as described in step 230 below, includes determining, based on the received token data, that the access token of the first user is based on the authority of the second user. In addition, denying access to the resource device 140, as described in step 240 below, includes denying access to the resource device 140 by the first user based on determining that the access token of the first user is based on the authority of the second user.

The process 200A can include determining that the access token relies on authorization of a blacklisted user (230). For instance, the resource device 140 can determine that the limited token 126a relies on authorization of the user, role, or permission level indicated by the revocation data. In some instances, the resource device 140 can initially store information indicated by the revocation data in a blacklist entry within the access control blacklist 142, and then compare the information in the blacklist entry to the token data 126b. When the information matches, the resource device 140 determines that the limited token 126a relies on authorization of the user, role, or permission indicated by the revocation data.

In some implementations, the resource device 140 determines that the access token relies on authorization of the user, role, or permission level indicated by the revocation data based on locally stored data at the resource device 140. In such implementations, the resource device 140 is configured to use the locally stored data to evaluate whether to grant access to the resource device independent of whether the resource device has network connectivity.

The process 200A can include denying access to the resource device (240). For instance, in response to determining that the limited token 126a relies on authorization of the user, role, or permission indicated by the revocation data (e.g., which has been incorporated into the blacklist of the resource device), the resource device 140 can deny the sharee device 130 access to the resource device 140. In some instances, access can be denied prior to the expiration of the limited token 126a. For example, as depicted in the example in FIG. 1, although the token data 126b indicates that the sharee device 130 has authority to access the resource device 140, access can still be denied based on the revocation data received. In this example, a user's access to the resource device 140 can be revoked prior to the expiration of the limited token 126a.

In some implementations, the process 200A may include additional operations. For instance, in response to receiving the revocation data, the process 200A includes storing an entry in the access control blacklist 142 stored locally at the resource device 140. The entry indicates the user, role, or permission level indicated by the revocation data. The process 200A may also include comparing one or more users, roles, or permission levels indicated in the stored blacklist 142 with a user, role or permission level indicated by the token data derived from the access token. In addition, denying the resource access to the resource device is based at least in part on the comparison.

In some implementations, the process 200A can additionally include storing a blacklist entry for a user in an access blacklist stored at the resource device. The process 200A can additionally include determining that one or more access tokens granted to the user have expired based on the blacklist entry, and deleting the blacklist entry for the user based on determining that one or more access tokens granted to the user have expired.

In some instances, the process 200A can further include the resource device 140 determining that the received token data corresponds to a valid and unexpired token that provides access to the resource. In such instances, denying access to the resource device 140 includes denying access to the resource device 140 after determining that the received token data corresponds to a valid and unexpired token that provides access to the resource. This can be based on determining that the access token relies on authorization of the user, role, or permission level indicated by the revocation data.

Referring now to FIG. 2B, the process 200B can include providing an access token (212), storing an access control list (222), receiving data indicating that access should be revoked (232), and transmitting revocation data (242).

In more detail, the process 200B can include providing an access token (212). For instance, the access granting authority 120 can provide the limited token 126a to the sharee device 130 that enables the sharee device 130 to gain access to the resource device 140. The limited token 126a can be configured to expire at a predetermined expiration time. As described previously, the predetermined expiration time can be based on the particular user associated with the sharee device 130 (e.g., user role), the type of device access provided to the sharee device 130 (e.g., permission level), or the device characteristics of the sharee device 130 (e.g., device type).

The process 200B can include storing an access control list (222). For instance, the access granting authority 120 can store the user access control list 122 indicating the user and the predetermined expiration time for the limited token 126a. In some instances, the device granting authority can use the master token 124 to determine the limited token 126a to be provided to the sharee device 130, create a new entry for the sharee and its limited token 126a within access control list 122, and then store the updated access control list 122. In some implementations, the access control list 122 indicates a role or a permission level for accessing the resource device by the user.

The process 200B can include receiving data indicating that access should be revoked (232). For instance, the access granting authority 120 can receive, before the predetermined expiration time of the limited token 126a, data indicating that access to the resource device 140 by the user of the sharee device 130 should be revoked. In some instances, the received data can be included within a revocation instruction transmitted from the owner device 110 that identifies user information (e.g., a user identifier), or token information associated with the limited token 126a.

The process 200B can include transmitting revocation data (242). For instance, the access granting authority 120 can transmit revocation data to the resource device 140 indicating the user of the sharee device 130 whose access should be revoked and data indicating the expiration time of the limited token 126a. As described previously with respect to FIG. 2A, the transmitted revocation data can be used by the resource device 140 to deny access to the sharee device 130.

In some implementations, transmitting the revocation data includes transmitting revocation data for inclusion in an access control blacklist stored on the resource device 140. In some implementations, the transmitted revocation data identifies a particular user and the duration that an access token grants the particular user access to the resource.

Figure 3:
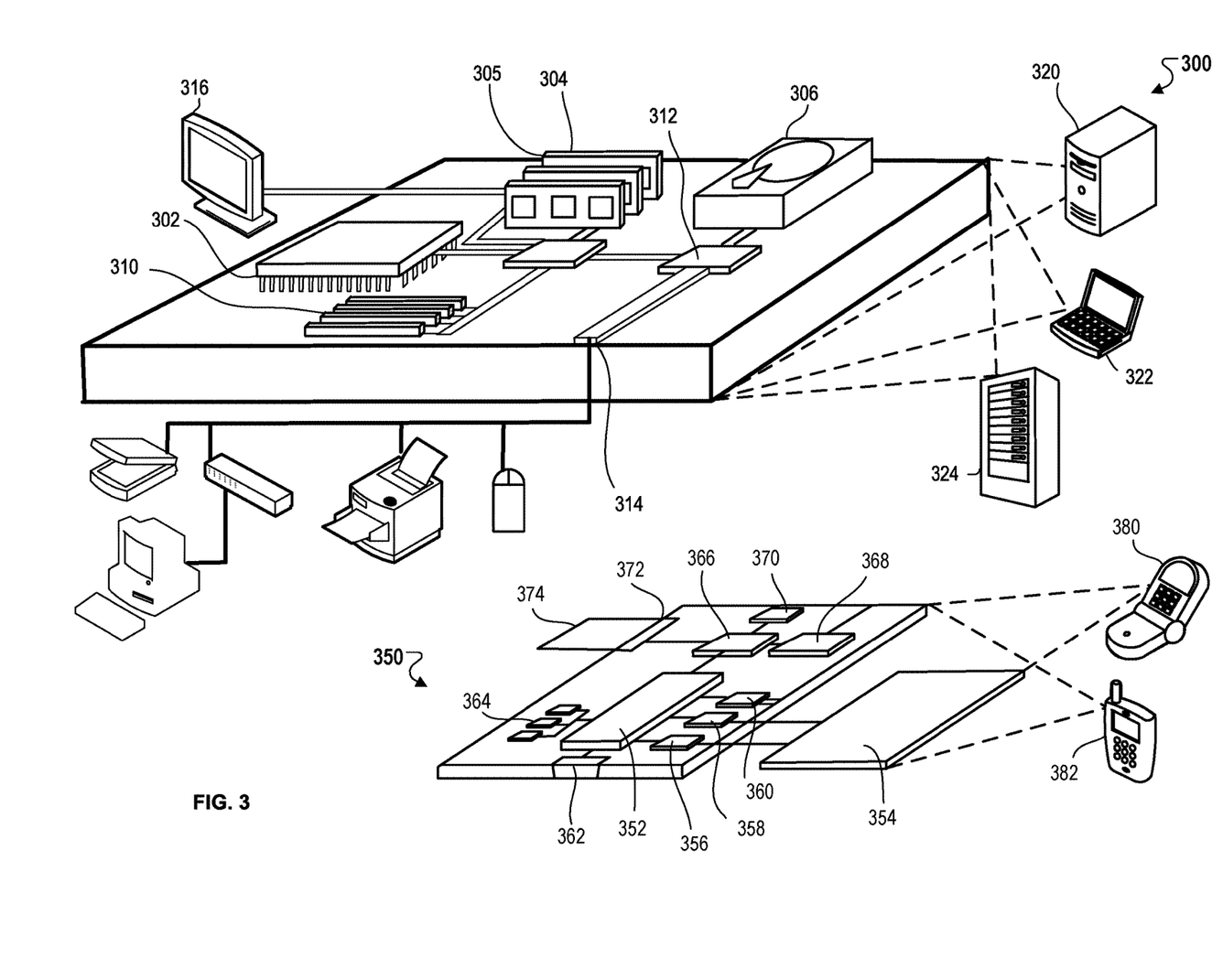
FIG. 3 is a block diagram of computing devices on which the processes described herein, or potions thereof, can be implemented.

FIG. 3 is a block diagram of computing devices 300, 350 that can be used to implement the systems and methods described in this document, as either a client or as a server or plurality of servers. Computing device 300 is intended to represent various forms of digital computers, such as laptops, desktops, workstations, personal digital assistants, servers, blade servers, mainframes, and other appropriate computers. Computing device 350 is intended to represent various forms of mobile devices, such as personal digital assistants, cellular telephones, smartphones, and other similar computing devices. Additionally, computing device 300 or 350 can include Universal Serial Bus (USB) flash drives. The USB flash drives can store operating systems and other applications. The USB flash drives can include input/output components, such as a wireless transmitter or USB connector that can be inserted into a USB port of another computing device. The components shown here, their connections and relationships, and their functions, are meant to be exemplary only, and are not meant to limit implementations of the inventions described and/or claimed in this document.

Computing device 300 includes a processor 302, memory 304, a storage device 306, a high-speed interface 308 connecting to memory 304 and high-speed expansion ports 310, and a low speed interface 312 connecting to low speed bus 314 and storage device 306. Each of the components 302, 304, 306, 308, 310, and 312, are interconnected using various busses, and can be mounted on a common motherboard or in other manners as appropriate. The processor 302 can process instructions for execution within the computing device 300, including instructions stored in the memory 304 or on the storage device 306 to display graphical information for a GUI on an external input/output device, such as display 316 coupled to high speed interface 308. In other implementations, multiple processors and/or multiple buses can be used, as appropriate, along with multiple memories and types of memory. Also, multiple computing devices 300 can be connected, with each device providing portions of the necessary operations, e.g., as a server bank, a group of blade servers, or a multi-processor system.

The memory 304 stores information within the computing device 300. In one implementation, the memory 304 is a volatile memory unit or units. In another implementation, the memory 304 is a non-volatile memory unit or units. The memory 304 can also be another form of computer-readable medium, such as a magnetic or optical disk.

The storage device 306 is capable of providing mass storage for the computing device 300. In one implementation, the storage device 306 can be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product can also contain instructions that, when executed, perform one or more methods, such as those described above. The information carrier is a computer- or machine-readable medium, such as the memory 304, the storage device 306, or memory on processor 302.

The high speed controller 308 manages bandwidth-intensive operations for the computing device 300, while the low speed controller 312 manages lower bandwidth intensive operations. Such allocation of functions is exemplary only. In one implementation, the high-speed controller 308 is coupled to memory 304, display 316, e.g., through a graphics processor or accelerator, and to high-speed expansion ports 310, which can accept various expansion cards (not shown). In the implementation, low-speed controller 312 is coupled to storage device 306 and low-speed expansion port 314. The low-speed expansion port, which can include various communication ports, e.g., USB, Bluetooth, Ethernet, wireless Ethernet can be coupled to one or more input/output devices, such as a keyboard, a pointing device, microphone/speaker pair, a scanner, or a networking device such as a switch or router, e.g., through a network adapter. The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

The computing device 300 can be implemented in a number of different forms, as shown in the figure. For example, it can be implemented as a standard server 320, or multiple times in a group of such servers. It can also be implemented as part of a rack server system 324. In addition, it can be implemented in a personal computer such as a laptop computer 322. Alternatively, components from computing device 300 can be combined with other components in a mobile device (not shown), such as device 350. Each of such devices can contain one or more of computing device 300, 350, and an entire system can be made up of multiple computing devices 300, 350 communicating with each other.

Computing device 350 includes a processor 352, memory 364, and an input/output device such as a display 354, a communication interface 366, and a transceiver 368, among other components. The device 350 can also be provided with a storage device, such as a micro-drive or other device, to provide additional storage. Each of the components 350, 352, 364, 354, 366, and 368, are interconnected using various buses, and several of the components can be mounted on a common motherboard or in other manners as appropriate.

The processor 352 can execute instructions within the computing device 350, including instructions stored in the memory 364. The processor can be implemented as a chipset of chips that include separate and multiple analog and digital processors. Additionally, the processor can be implemented using any of a number of architectures. For example, the processor 310 can be a CISC (Complex Instruction Set Computers) processor, a RISC (Reduced Instruction Set Computer) processor, or a MISC (Minimal Instruction Set Computer) processor. The processor can provide, for example, for coordination of the other components of the device 350, such as control of user interfaces, applications run by device 350, and wireless communication by device 350.

Processor 352 can communicate with a user through control interface 358 and display interface 356 coupled to a display 354. The display 354 can be, for example, a TFT (Thin-Film-Transistor Liquid Crystal Display) display or an OLED (Organic Light Emitting Diode) display, or other appropriate display technology. The display interface 356 can comprise appropriate circuitry for driving the display 354 to present graphical and other information to a user. The control interface 358 can receive commands from a user and convert them for submission to the processor 352. In addition, an external interface 362 can be provide in communication with processor 352, so as to enable near area communication of device 350 with other devices. External interface 362 can provide, for example, for wired communication in some implementations, or for wireless communication in other implementations, and multiple interfaces can also be used.

The memory 364 stores information within the computing device 350. The memory 364 can be implemented as one or more of a computer-readable medium or media, a volatile memory unit or units, or a non-volatile memory unit or units. Expansion memory 374 can also be provided and connected to device 350 through expansion interface 372, which can include, for example, a SIMM (Single In Line Memory Module) card interface. Such expansion memory 374 can provide extra storage space for device 350, or can also store applications or other information for device 350. Specifically, expansion memory 374 can include instructions to carry out or supplement the processes described above, and can include secure information also. Thus, for example, expansion memory 374 can be provide as a security module for device 350, and can be programmed with instructions that permit secure use of device 350. In addition, secure applications can be provided via the SIMM cards, along with additional information, such as placing identifying information on the SIMM card in a non-hackable manner.

The memory can include, for example, flash memory and/or NVRAM memory, as discussed below. In one implementation, a computer program product is tangibly embodied in an information carrier. The computer program product contains instructions that, when executed, perform one or more methods, such as those described above. The information carrier is a computer- or machine-readable medium, such as the memory 364, expansion memory 374, or memory on processor 352 that can be received, for example, over transceiver 368 or external interface 362.

Device 350 can communicate wirelessly through communication interface 366, which can include digital signal processing circuitry where necessary. Communication interface 366 can provide for communications under various modes or protocols, such as GSM voice calls, SMS, EMS, or MMS messaging, CDMA, TDMA, PDC, WCDMA, CDMA2000, or GPRS, among others. Such communication can occur, for example, through radio-frequency transceiver 368. In addition, short-range communication can occur, such as using a Bluetooth, Wi-Fi, or other such transceiver (not shown). In addition, GPS (Global Positioning System) receiver module 670 can provide additional navigation- and location-related wireless data to device 350, which can be used as appropriate by applications running on device 350.

Device 350 can also communicate audibly using audio codec 360, which can receive spoken information from a user and convert it to usable digital information. Audio codec 360 can likewise generate audible sound for a user, such as through a speaker, e.g., in a handset of device 350. Such sound can include sound from voice telephone calls, can include recorded sound, e.g., voice messages, music files, etc. and can also include sound generated by applications operating on device 350.

The computing device 350 can be implemented in a number of different forms, as shown in the figure. For example, it can be implemented as a cellular telephone 380. It can also be implemented as part of a smartphone 382, personal digital assistant, or other similar mobile device.

Various implementations of the systems and methods described here can be realized in digital electronic circuitry, integrated circuitry, specially designed ASICs (application specific integrated circuits), computer hardware, firmware, software, and/or combinations of such implementations. These various implementations can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device, e.g., magnetic discs, optical disks, memory, Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device, e.g., a CRT (cathode ray tube) or LCD (liquid crystal display) monitor for displaying information to the user and a keyboard and a pointing device, e.g., a mouse or a trackball by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

The systems and techniques described here can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the systems and techniques described here, or any combination of such back end, middleware, or front end components. The components of the system can be interconnected by any form or medium of digital data communication, e.g., a communication network. Examples of communication networks include a local area network ("LAN"), a wide area network ("WAN"), and the Internet.

The computing system can include clients and servers. A client and server are generally remote from each other and typically interact through a communication network. The relationship of client and server arises by virtue of computer programs running on the respective computers and having a client-server relationship to each other.

A number of embodiments have been described. Nevertheless, it will be understood that various modifications can be made without departing from the spirit and scope of the invention. In addition, the logic flows depicted in the figures do not require the particular order shown, or sequential order, to achieve desirable results. In addition, other steps can be provided, or steps can be eliminated, from the described flows, and other components can be added to, or removed from, the described systems. Accordingly, other embodiments are within the scope of the following claims.

What is claimed is:

1. A method performed by a resource device comprising a data processing apparatus, the method comprising:

after multiple users have each been granted a respective access token allowing access to a resource device, receiving, by the resource device, revocation data indicating that the previously granted access to the resource device should be revoked for one or more of the multiple users, wherein the revocation data indicates (i) a user, role, or permission level for which access is revoked and (ii) an authorization duration or an authorization expiration time for a previous authorization of access to the resource device for the indicated user, role, or permission level;

after receiving the revocation data, receiving, by the resource device, token data derived from a first access token that allows access to the resource device, the first access token being issued to a first user;

determining, by the resource device and based on the token data, that authorization for the first access token is dependent on authorization for one or more second access tokens that provide to access to the resource device, the one or more second access tokens respectively being granted to users different from the first user;

determining, by the resource device, that at least one of the one or more second access tokens corresponds to the user, role, or permission level indicated by the revocation data; and in response to receiving the token data and before expiration of the previous authorization of access to the resource device for the indicated user, role, or permission level, denying, by the resource device, access to the resource device based on (i) determining that the first access token is dependent on authorization for the one or more second access tokens, and (ii) determining that at least one of the one or more second access tokens corresponds to the user, role, or permission level indicated by the revocation data.

2. The method of claim 1, comprising:

in response to receiving the revocation data, storing an entry in an access control blacklist stored locally at the resource device, the entry indicating the user, role, or permission level indicated by the revocation data; and comparing one or more users, roles, or permission levels indicated in the stored blacklist with a user, role or permission level indicated by the token data derived from the first access token;

wherein denying the resource access to the resource device is based at least in part on the comparison.

3. The method of claim 1, wherein the resource device determines that authorization for the first access token is dependent on authorization for one or more second access tokens based on locally stored data at the resource device, the resource device being configured to use the locally stored data to evaluate whether to grant access to the resource device independent of whether the resource device has network connectivity.

4. The method of claim 1, wherein receiving the revocation data comprises receiving the revocation data at a time that is (i) after a particular access token has been granted, the particular access token having an authorization expiration time, and (ii) before the authorization expiration time for the particular access token;

wherein receiving the token data comprises receiving token data derived from the particular access token; and wherein the determining and the denying are performed at a second time that is (i) after the particular access token has been granted and (ii) before the authorization expiration time for the particular access token.

5. The method of claim 1, comprising:

storing, in an access control blacklist stored at the resource device, a blacklist entry for the first user;

determining, based on the blacklist entry, that one or more access tokens granted to the first user have expired; and based on determining that one or more access tokens granted to first the user have expired, deleting the blacklist entry for the first user from the access control blacklist.

6. The method of claim 5, comprising determining, by the resource device, that the received token data corresponds to a valid and unexpired token that provides access to the resource;

wherein denying access to the resource device comprises denying access to the resource device after determining that the received token data corresponds to a valid and unexpired token that provides access to the resource device, based on (i) determining that authorization for the first access token is dependent on authorization for one or more second access and (ii) determining that at least one of the one or more second access tokens correspond to the user, role, or permission level indicated by the revocation data.

7. The method of claim 1, wherein the revocation data is received, from a user device, through a proximity-based connection established between the resource device and the user device.

8. The method of claim 1, wherein the revocation data is received, from a server computer, through a network connection established between the resource device and the server computer.

9. The method of claim 1, wherein denying access to the resource device comprises:

determining a particular second access token from among the one or more second access tokens corresponds to the user, role, or permission level for which access is revoked; and storing an entry in an access control blacklist such that access to the resource device is denied for any of the multiple users that have been granted access tokens that depend on authorization for the particular second access token.

10. A non-transitory computer-readable storage device encoded with computer program instructions that, when executed by one or more computers, cause the one or more computers to perform operations comprising:

after multiple users have each been granted a respective access token allowing access to a resource device, receiving, by the resource device, revocation data indicating that the previously granted access to the resource device should be revoked for one or more of the multiple users, wherein the revocation data indicates (i) a user, role, or permission level for which access is revoked and (ii) an authorization duration or an authorization expiration time for a previous authorization of access to the resource device for the indicated user, role, or permission level;

after receiving the revocation data, receiving, by the resource device, token data derived from a first access token that allows access to the resource device, the first access token being issued to a first user;

determining, by the resource device and based on the token data, that authorization for the first access token is dependent on authorization for one or more second access tokens that provide to access to the resource device, the one or more second access tokens respectively being granted to users different from the first user;

determining, by the resource device, that at least one of the one or more second access tokens corresponds to the user, role, or permission level indicated by the revocation data; and in response to receiving the token data and before expiration of the previous authorization of access to the resource device for the indicated user, role, or permission level, denying, by the resource device, access to the resource device based on (i) determining that the first access token is dependent on authorization for the one or more second access tokens, and (ii) determining that at least one of the one or more second access tokens corresponds to the user, role, or permission level indicated by the revocation data.

11. The non-transitory computer-readable storage device of claim 10, wherein the operations further comprise:

in response to receiving the revocation data, storing a blacklist entry in an access control blacklist stored locally at the resource device, the entry indicating the user, role, or permission level indicated by the revocation data; and comparing one or more users, roles, or permission levels indicated in the stored blacklist with a user, role or permission level indicated by the token data derived from the first access token;

wherein denying the resource access to the resource device is based at least in part on the comparison.

12. A system comprising:

one or more computers; and a non-transitory computer-readable medium coupled to the one or more computers having instructions stored thereon, which, when executed by the one or more computers, cause the one or more computers to perform operations comprising:

after multiple users have each been granted a respective access token allowing access to a resource device, receiving, by the resource device, revocation data indicating that the previously granted access to the resource device should be revoked for one or more of the multiple users, wherein the revocation data indicates (i) a user, role, or permission level for which access is revoked and (ii) an authorization duration or an authorization expiration time for a previous authorization of access to the resource device for the indicated user, role, or permission level;

after receiving the revocation data, receiving, by the resource device, token data derived from a first access token that allows access to the resource device, the first access token being issued to a first user;

determining, by the resource device and based on the token data, that authorization for the first access token is dependent on authorization for one or more second access tokens that provide to access to the resource device, the one or more second access tokens respectively being granted to users different from the first user;

determining, by the resource device, that at least one of the one or more second access tokens corresponds to the user, role, or permission level indicated by the revocation data; and in response to receiving the token data and before expiration of the previous authorization of access to the resource device for the indicated user, role, or permission level, denying, by the resource device, access to the resource device based on (i) determining that the first access token is dependent on authorization for the one or more second access tokens, and (ii) determining that at least one of the one or more second access tokens corresponds to the user, role, or permission level indicated by the revocation data.

13. The system of claim 12, wherein the operations comprise:

in response to receiving the revocation data, storing an entry in an access control blacklist stored locally at the resource device, the entry indicating the user, role, or permission level indicated by the revocation data; and comparing one or more users, roles, or permission levels indicated in the stored blacklist with a user, role or permission level indicated by the token data derived from the first access token;

wherein denying the resource access to the resource device is based at least in part on the comparison.

14. The system of claim 12, wherein the resource device determines that authorization for the first access token is dependent on authorization for one or more second access tokens based on locally stored data at the resource device, the resource device being configured to use the locally stored data to evaluate whether to grant access to the resource device independent of whether the resource device has network connectivity.

15. The system of claim 12, wherein receiving the revocation data comprises receiving the revocation data at a time that is (i) after a particular access token has been granted, the particular access token having an authorization expiration time, and (ii) before the authorization expiration time for the particular access token;

wherein receiving the token data comprises receiving token data derived from the particular access token; and wherein the determining and the denying are performed at a second time that is (i) after the particular access token has been granted and (ii) before the authorization expiration time for the particular access token.

* * * * *